March 17, 1936.　　　I. L. DE JONGH　　　2,034,462
REFRIGERATING APPARATUS
Original Filed April 20, 1927　　2 Sheets-Sheet 1

March 17, 1936.  I. L. DE JONGH  2,034,462
REFRIGERATING APPARATUS
Original Filed April 20, 1927   2 Sheets-Sheet 2

Patented Mar. 17, 1936

2,034,462

UNITED STATES PATENT OFFICE 2,034,462

REFRIGERATING APPARATUS

Ivan L. de Jongh, Los Angeles, Calif., assignor, by mesne assignments, to General Motors Corporation, a corporation of Delaware Application April 20, 1927, Serial No. 185,243
Renewed July 3, 1935

3 Claims. (Cl. 62—141)

This invention relates to coolers and has for an object to provide an automatic, constant pressure drinking water cooler.

Another object of the invention is to provide a drinking water cooler combining as a unit a self-contained power plant and refrigerating apparatus and a closed constant pressure water tank in which is disposed the refrigerating or cooling coil, so that the same is exposed for direct contact of the water in and passing through the closed tank.

Another object is to provide a unitary, self-contained water cooling plant adapted to be connected to any source of supply as a water system having a high and variable water pressure, and to provide means for automatically controlling the said pressure in a water containing tank in the apparatus and in which a refrigerating or cooling means is exposed for contact with the water.

Further objects and advantages of the present invention will be apparent from the following description, reference being had to the accompanying drawings, wherein a preferred form of the present invention is clearly shown.

Figure 1:
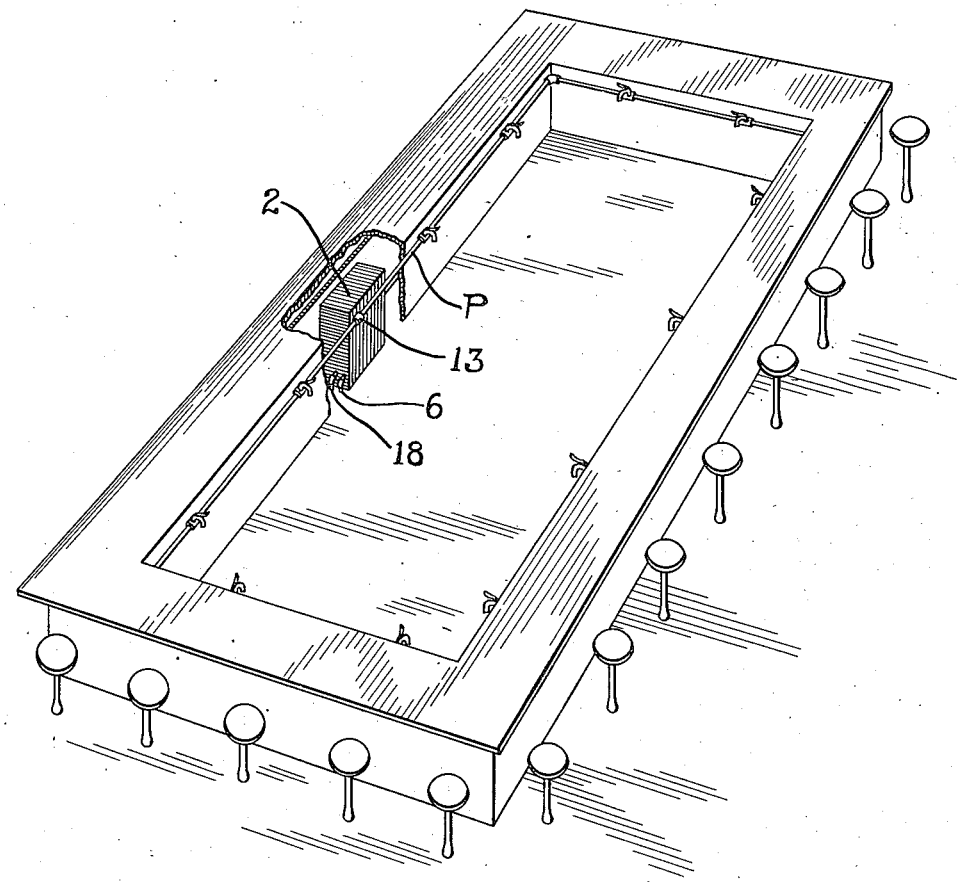
Fig. 1 is a perspective showing one adaptation of the invention.
Figure 2:
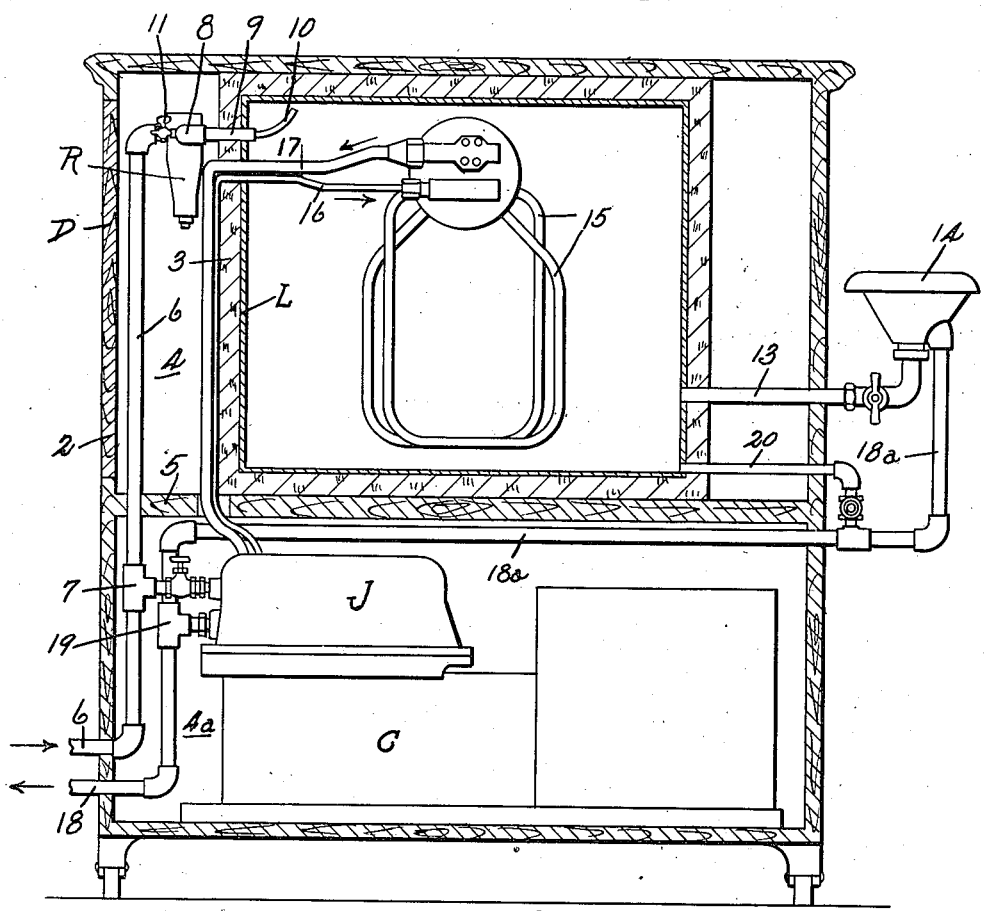
Fig. 2 is a vertical sectional view showing in somewhat diagrammatic arrangement the piping of the cooler.
Figure 3:
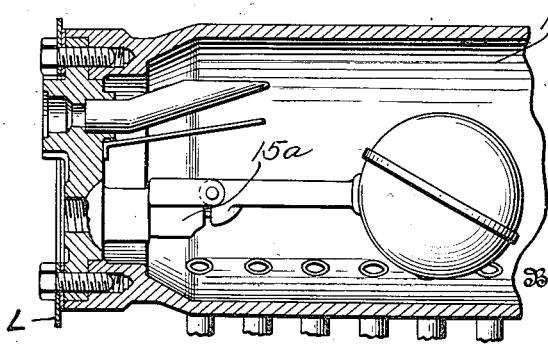
Fig. 3 is a vertical cross sectional view of part of the cooling coil.

The present water cooler is preferably in the form of a unitary structure including a suitable cabinet or box 2, having an enclosed water tank 3, which in the present case is shown as in the upper compartment 4 of the cabinet which may be provided with a horizontal floor 5 dividing the upper chamber 4 from lower chamber 4a. The cabinet may be provided with a door D.

The water tank 3 is preferably substantially closed and is designed to contain water under a suitable degree of pressure, and which may be supplied to the tank from a supply pipe 6 connectible to a water system. The pipe 6 is provided with a T 7 and continues from this up into the upper chamber 4. The upper end of the pipe 6 is connected to an automatic pressure regulator R of any conventional form, and from which extends a discharge connection 8, to which is attached a nozzle or outlet section 9 for discharging the water into the water tank 3.

As the tank is filled, it is necessary to allow the escape of the displaced air, and this is permitted through an air vent tube 10 which I prefer to extend into and through the nozzle 9 and therefore to require only one aperture in the lining L of the tank 3.

The outer end of the air vent tube 10 is provided with a controlling valve 11 which is opened while the tank is being filled and is closed when the tank has been filled.

Water may be drawn from the tank through any suitable means which may consist of pipe 13 leading to a drinking fountain 14 provided with a manually openable valve, as shown, outside of the cabinet 2 for controlling the delivery of water to the fountain. Obviously the water from the cooling chamber 3 may be carried to a distributing pipe P as in Fig. 1 when the cooler is used in large public institutions or where extended and remote discharge service is required.

The water is maintained at the desired temperature by means of a cooling coil system 15 which, it is a feature of my invention, to locate and expose directly in the closed fresh water tank 2. The cooling coil 15 is connected by a refrigerant tube 16 to a suitable type of compressor and condenser indicated at C, which preferably is automatic in operation and includes a power plant for operating the compressor and includes automatic means for starting and stopping a motor according to the predetermined temperature to be maintained in the water tank. Any suitable refrigerating apparatus may be utilized, but I prefer a cooling coil 15 as shown, having a cylindrical boiler or reservoir and heat collecting devices such as depending loops which contain a relatively large quantity of liquid refrigerant. The flow of refrigerant to the coil 15 may be controlled by a float valve 15a similar to that shown and described in the patent to Robert G. Osborn, No. 1,556,708, issued October 13, 1926.

The compressed refrigerant is carried to the coils 15 by the tube 16 and the expanded refrigerant returns through the pipe 17 to the compressor to be again compressed in the usual manner. Such a refrigerant may consist of sulphur dioxide.

The compressor-condenser may be similar to that shown in the patent to Bechtold and Mellowes, No. 1,276,612, issued August 20, 1918, in which the compressed refrigerant is conducted into the jacket J and in which the compressed refrigerant is cooled and liquefied by passing water through a coil contained in said jacket.

A further feature of the invention is the direct connection of the water cooling jacket J of the compressor-condenser to the supply T 7 above mentioned; this arrangement being both simple and practicable and providing for a compact arrangement of parts.

Another feature consists in providing a common drain pipe 18 for carrying away the waste water from the fountain 14, and for carrying away the used cooling water from the compressor-condenser jacket J. The drain pipe 18 is shown as connected by T 19 to the drain outlet of the jack J and from the T 19 extends a pipe 18ª which is connected to the fountain 14. When it is desired to entirely drain the water tank 3, this may be done through a drain pipe 20 connected to the common drain 18ª.

From the above it will be seen that I have provided an extremely simple and a very compact and self-contained power plant refrigerating machine having its cooling coil disposed in a closed, pressure tank through which the water to be cooled passes, and directly contacts with the cooling coil.

While the form of embodiment of the invention as herein disclosed, constitutes a preferred form, it is to be understood that other forms might be adopted, all coming within the scope of the claims which follow.

What is claimed is as follows:

1. A drinking water cooler including a cabinet provided with an enclosed, closed pressure water tank adapted to contain water under pressure; a refrigerant coil enclosed in the tank and exposed to contact with the water to be cooled while in and passing through the tank; means for automatically supplying the tank with water under a constant pressure from a source of supply, and an air vent for the displaced air while the tank is being initially filled with water; said means including a pressure reducer having a discharge leading into the tank, said air vent including a tube leading through the said discharge to the exterior of the tank.

2. In a mechanically refrigerated liquid cooler, the combination of a container for the liquid to be dispensed, means for supplying liquid to the container, a valve controlled outlet for the container, and a refrigerant evaporating chamber within the container positioned relatively remote from the said liquid supply means and the outlet, whereby ice formed on the chamber will be relatively remote from both the said means and outlet.

3. In a mechanically refrigerated liquid cooler, the combination of a container for the liquid to be dispensed, said container having an inlet for liquid positioned in the top thereof, and having a valve controlled outlet for the liquid in one side thereof and positioned near the bottom of the container, and a refrigerant evaporating chamber within the liquid container which is positioned adjacent a wall of the container and relatively remote from the liquid inlet and outlet.

IVAN L. DE JONGH.